United States Patent
Morris

(10) Patent No.: US 8,392,938 B2
(45) Date of Patent: Mar. 5, 2013

(54) SYSTEM FOR PROVIDING A DISTRIBUTED AUDIENCE RESPONSE TO A BROADCAST

(75) Inventor: Robert P. Morris, Raleigh, NC (US)

(73) Assignee: Swift Creek Systems, LLC, Portsmouth, NH (US)

( * ) Notice: Subject to any disclaimer, the term of this patent is extended or adjusted under 35 U.S.C. 154(b) by 2741 days.

(21) Appl. No.: 11/022,151

(22) Filed: Dec. 21, 2004

(65) Prior Publication Data

US 2006/0136960 A1    Jun. 22, 2006

(51) Int. Cl.
- H04H 60/33 (2008.01)
- H04H 30/32 (2006.01)
- H04N 7/10 (2006.01)
- H04N 7/025 (2006.01)
- H04N 5/445 (2006.01)
- G06F 3/00 (2006.01)
- G06F 13/00 (2006.01)

(52) U.S. Cl. .................. 725/9; 725/10; 725/11; 725/16; 725/18; 725/13; 725/24; 725/32; 725/42

(58) Field of Classification Search ............... 725/9, 10, 725/11, 16, 18, 13, 24, 32, 42; 379/93.21, 379/93.17; 705/10
See application file for complete search history.

(56) References Cited

U.S. PATENT DOCUMENTS

| 5,694,162 A | 12/1997 | Freeny, Jr. | |
| 5,726,701 A * | 3/1998 | Needham | 725/105 |
| 6,678,890 B1 | 1/2004 | Cai | |
| 2002/0144273 A1 | 10/2002 | Reto | 725/86 |
| 2003/0078972 A1 | 4/2003 | Tapissier | 709/204 |

FOREIGN PATENT DOCUMENTS

| EP | 1241890 | * | 9/2002 |
| EP | 1241890 A2 | * | 9/2002 |

* cited by examiner

*Primary Examiner* — Scott Beliveau
*Assistant Examiner* — Yassin Alata

(57) ABSTRACT

A method and system for providing a distributed audience response for a broadcast records a response from a participating client of a broadcast and transmits the response to an audience server. The audience server combines the response with responses from other participating clients of the broadcast, and the combined response is then transmitted to a receiving client for playback in synchronization with the broadcast. Intelligible speech can be removed from the combined response. The participating client can be part of a group of clients of the broadcast, where the responses from the group of clients are combined and played back. A participant can invite certain other participants to "sit next to" him or her, where the responses of the invitees are configured to be intelligible over the combined response.

1 Claim, 10 Drawing Sheets

SYSTEM FOR PROVIDING A DISTRIBUTED AUDIENCE RESPONSE TO A BROADCAST

FIELD OF THE INVENTION

The present invention relates to broadcasts and more particularly to providing a distributed audience response to a broadcast.

BACKGROUND OF THE INVENTION

Broadcasting of various media are known in the art. Broadcasting includes television broadcasts with live on-site audiences or canned audiences, Internet broadcasts for small or no audience, single use broadcasts (pay-per-view, rentals, Internet video streams, slide shows, photo albums), and video conferencing, among others. However, with conventional broadcasting methods, the viewer has little if any sense of participation. There is no audience for most broadcasting methods. When there is an audience, the canned audience often sounds fake, and live studio audiences sometimes sound prompted or rehearsed. In other applications, such as video conferencing, there is often little privacy except for a mute button. These applications are designed for person-to-person communication rather than media content distribution.

Accordingly, there exists a need for a method and system for providing a distributed audience response to a broadcast. The method and system should provide a more genuine environment in a variety of broadcasting applications and allow users to participate as part of an audience.

SUMMARY OF THE INVENTION

A method and system for providing a distributed audience response for a broadcast records a response from a participating client of a broadcast and transmits the response to an audience server. The audience server combines the response with responses from other participating clients of the broadcast, and the combined response is then transmitted to a receiving client for playback in synchronization with the broadcast. Intelligible speech can be removed from the combined response. The participating client can be part of a group of clients of the broadcast, where the responses from the group of clients are combined and played back. A participant can decide to invite certain other participants to "sit next to" him or her, where the responses of the invitees are configured to be intelligible over the combined response.

DETAILED DESCRIPTION

The present invention provides a method and system for providing a distributed audience response to a broadcast. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 10 in conjunction with the discussion below.

Figure 1:
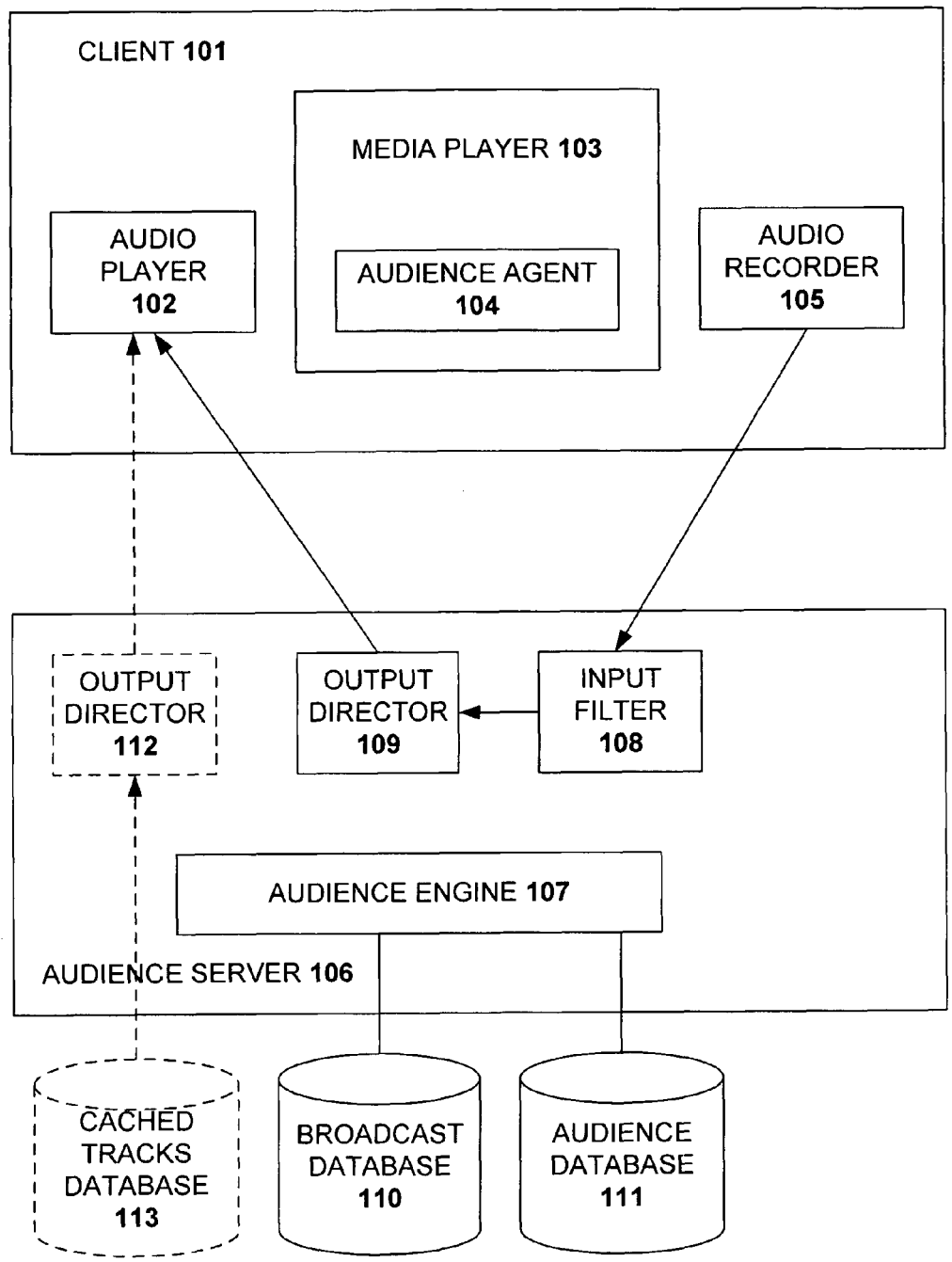
FIG. 1 illustrates an embodiment of a system for providing a distributed live concurrent audience.

FIG. 1 illustrates an embodiment of a system for providing a distributed live concurrent audience. The system includes a client 101 and an audience server 106. The client 101 includes an audio player 102, a media player 103, and optionally an audio recorder 105. The audio player 102 plays the audio from the audience, generated by the audience server 106. The media player 103 can be a television, a web browser, a personal computer application, a stereo, and/or a DVD/CD player. The media player 103 includes an audience agent 104, which allows the user to customize the audience experience, to provide information about himself, and to opt in or out of the audience. Optionally, the client 101 can include the audio recorder 105. If the user of the client 101 chooses to opt in to the audience, i.e., become a participant, the user's response is recorded by the audio recorder 105 and sent to the audience server 106 to be combined with the responses of other participants. If the user chooses not to opt in, or later chooses to opt out, of the audience, the user can listen to the audience without participating.

The audience server 106 includes an audience engine 107 that samples input streams via one or more input filters 108 and produces output streams via one or more output directors 109. The output stream can be played for the participant by the audio player 102. The input streams comprise the recorded responses received from participants from one or more clients 101. The number of output streams depends on the level of customization supported by the audience server 106. The broadcast database 110 tracks ongoing broadcasts. The audience database 111 tracks each client system and its settings and preferences. The output stream can then be played for the participant by the audio player 102. The user can choose to only listen to an output stream via output director 112 but not participate. The output stream can be previously recorded tracks stored in a cached tracks database 113.

Figure 2:
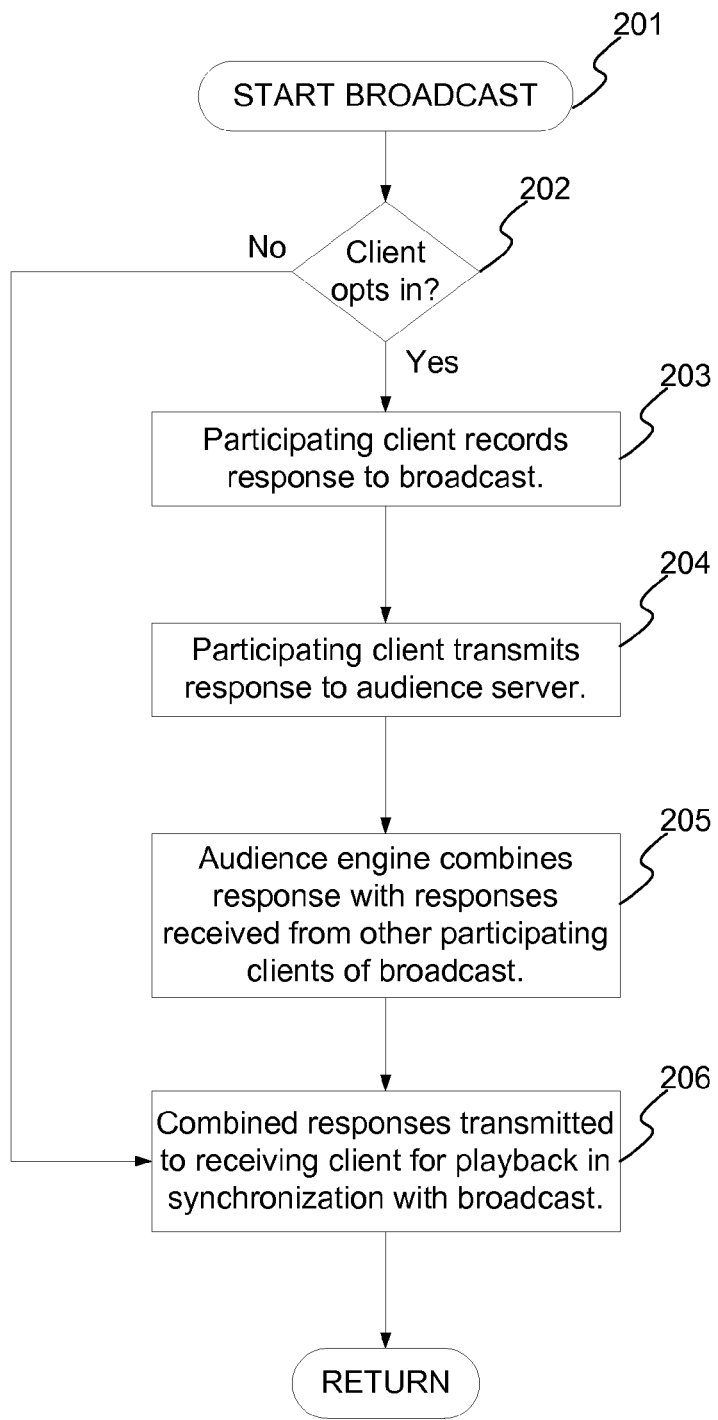
FIG. 2 is a flowchart illustrating an embodiment of a method for providing a distributed concurrent live audience.

FIG. 2 is a flowchart illustrating an embodiment of a method for providing a distributed concurrent live audience. First, the broadcast is started, via step 201. If the user of the client 101 chooses to opt in to (or participate in) the audience for a broadcast, via step 202, the participating client 101 records the response from the participant of the broadcast, via step 203. The participating client 101 then transmits the response to the audience engine 107 at the audience server 106, via step 204. The audience engine 107 at the audience server 106 combines the response with responses received from other participating clients of the broadcast, via step 204. The combined responses are then transmitted to a receiving client 101 for playback in synchronization with the broadcast, via step 206. Preferably, the receiving of recorded responses from participating clients, the combining of those received responses, and the transmitting of the combined response to the receiving client occur substantially in real time along with the playback of the broadcast to the distributed concurrent live audience. Any other client of the broadcast can also be listening to the combined response without providing input. If the user chooses not to participate, the user can still have the combined responses transmitted to the client 101 and played back in synchronization with the broadcast, via step 206. Accordingly, receiving clients 101 can also be participating clients 101, but need not be.

Optionally, if the audience has a small number of participants, the audience engine 107 can remove intelligible speech from the combined responses before transmitting it to the client 101. This is to simulate a real live audience, where participants often hear voices without being able to distinguish any specific voice. This is also to provide a level of privacy that currently does not exist with conventional approaches. A sampling of the input streams can also be used rather than the entire input streams. The client 101 may place time markings in the input streams which the audience engine 107 may use to synchronize the responses. Responses received after a specified time interval may be ignored because they have been received too late to be included in the combined response for playback to the listening clients. The client devices may receive periodic synchronization signals from the audience server 106 or some other common source so that the time markings are consistent.

Figure 3:
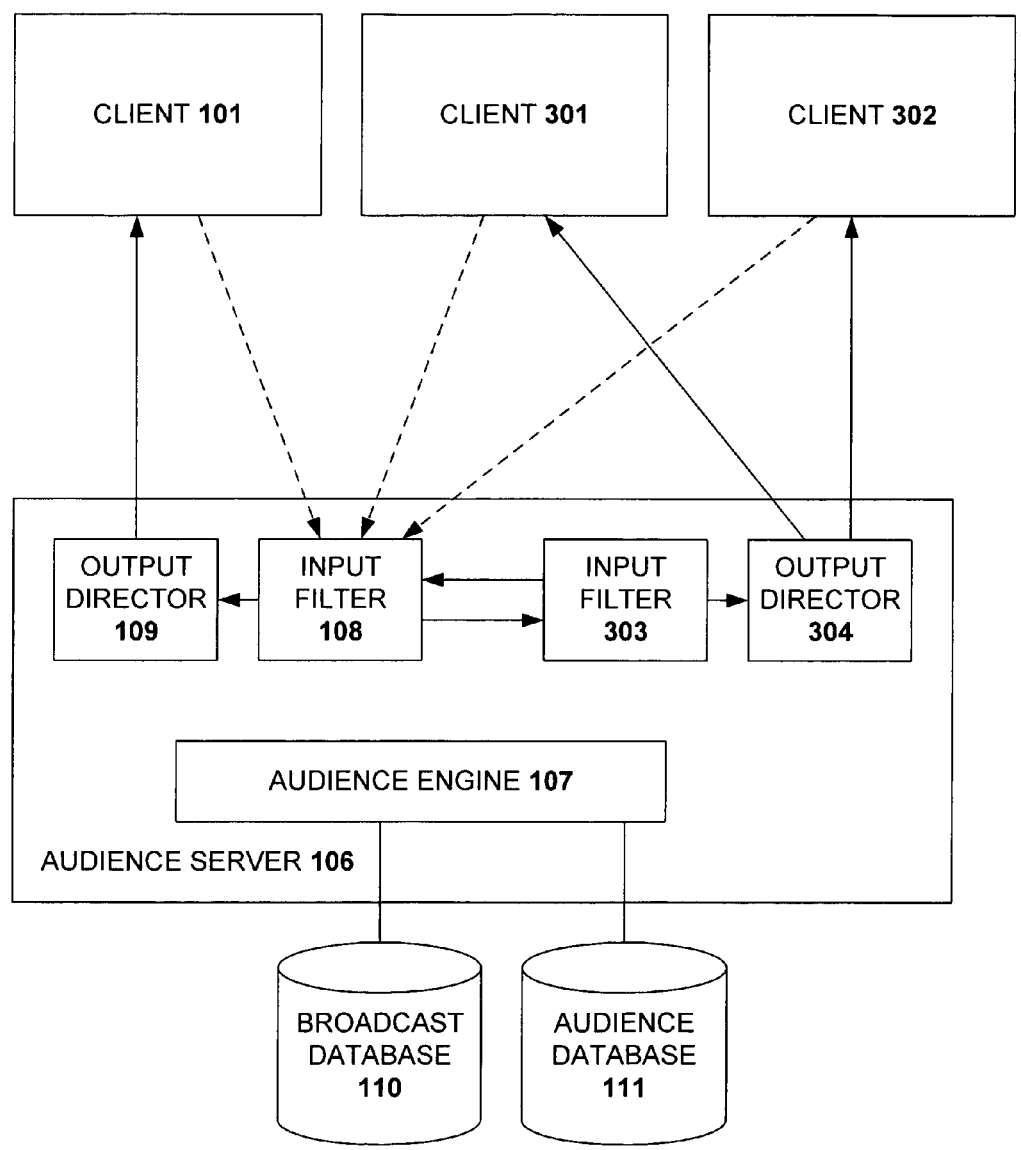
FIG. 3 illustrates a system where clients listen to different output streams.

A customization that can be provided by the system is to allow the participants to be part of the same audience but to listen to different output streams. As illustrated in FIG. 3, the participants at each client 101, 301, 302 contribute input to the audience. The clients 301 and 302 comprise the same components as client 101 illustrated in FIG. 1. Participants at clients 301-302 choose to listen to an output stream via the output director 304 that is subject to input filters 108 and 303. However, the participant at client 101 chooses to listen to a different output stream via output director 109.

Figure 4:
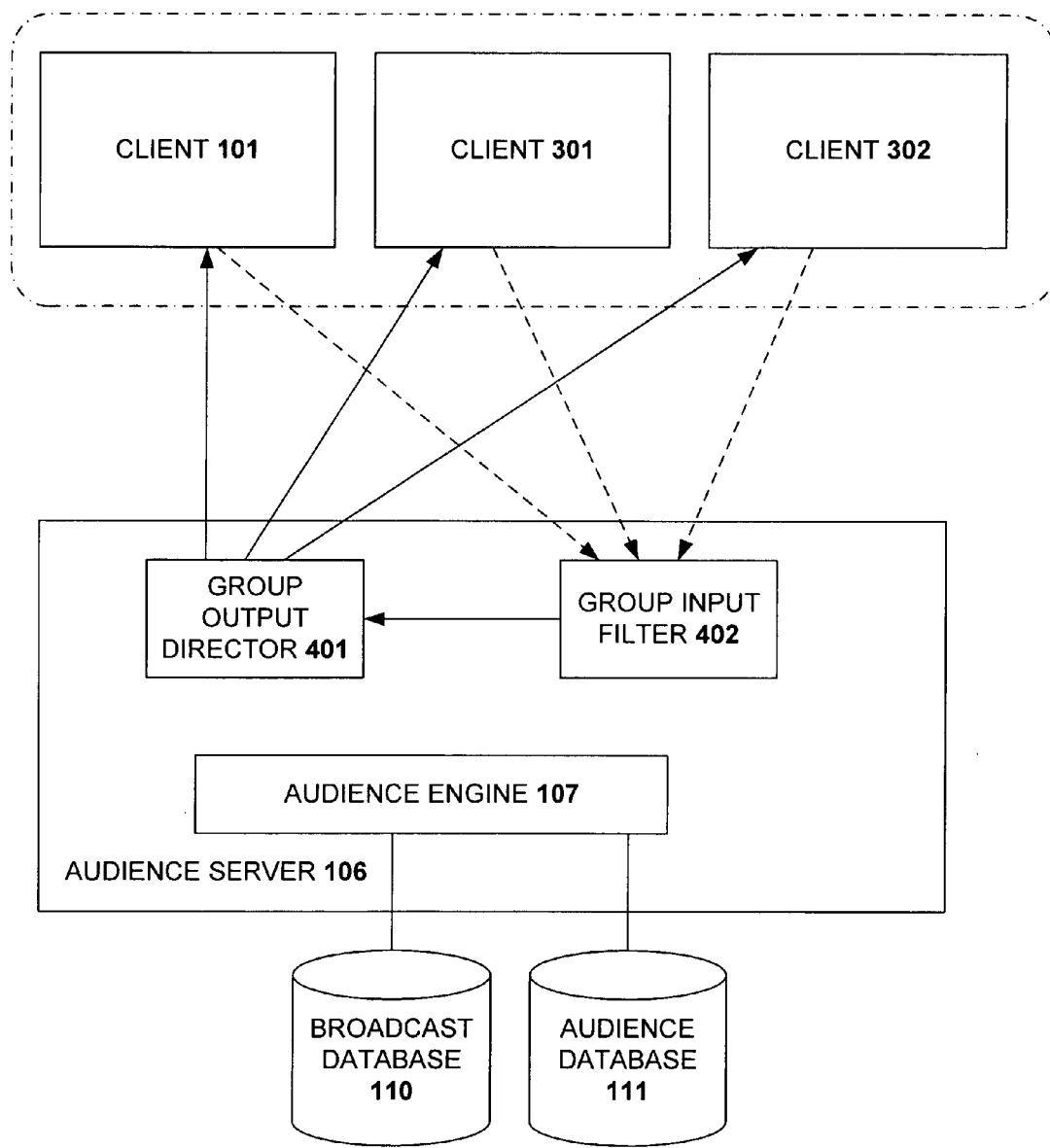
FIGS. 4 and 5 illustrate an embodiment of a system and method, respectively, for providing a distributed live concurrent group audience.
Figure 5:
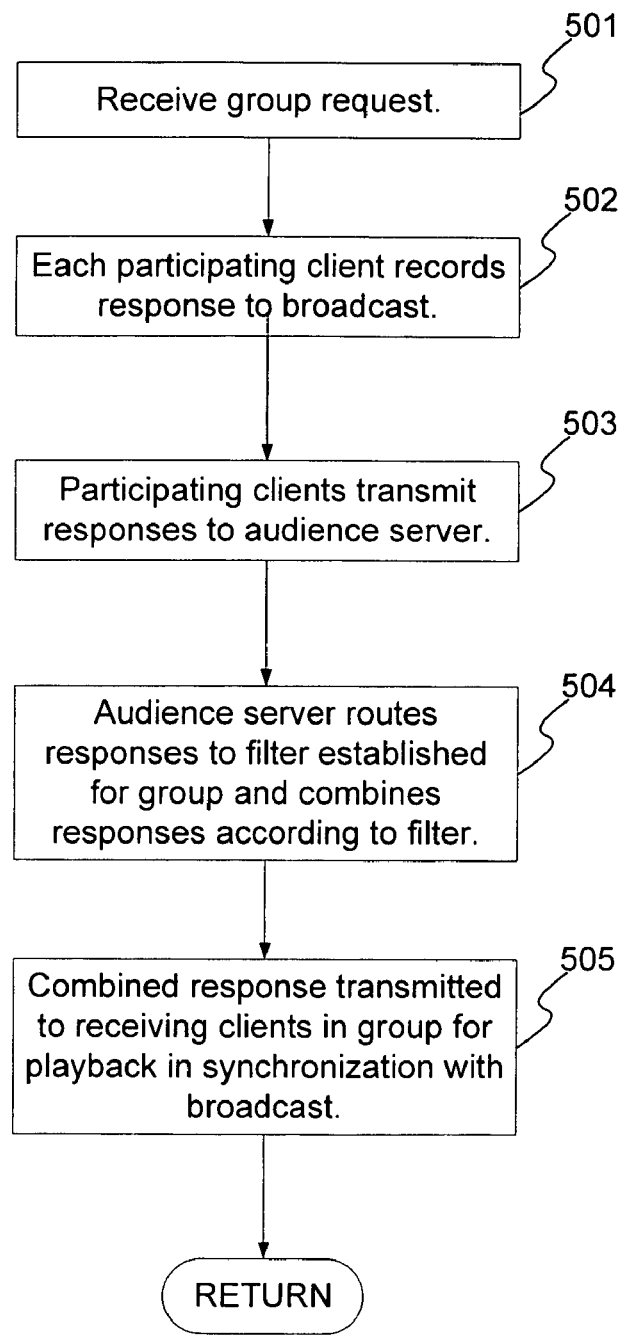

Another customization that can be provided by the system is to allow a group of participants to choose to be part of the same audience. FIGS. 4 and 5 illustrate an embodiment of a system and method, respectively, for providing a distributed live concurrent group audience. Utilizing the audience agent 104, the participants at each client 101, 301, 302 choose to be a group audience. The grouping can be based on any number of factors: demographics, geography, language, interests, custom build groups, employment type, etc. A group input filter 402 and a group output director 401 are defined for the group. When a group request is received, via step 501, by the audience agent 104 of each client 101, 301, 302, each client records the response of its respective participant of the broadcast, via step 502. The clients 101, 301, 302 each transmit their response to the audience engine 107 at the audience server 106, via step 503. The audience engine 107 at the audience server 106 routes each response to the filter 402 established for the group and combines the responses according to the filter 402, via step 504. The combined response is then transmitted to the receiving clients 101, 301, 302 in the group via the group output director 401 for playback in synchronization with the broadcast, via step 505.

Figure 6:
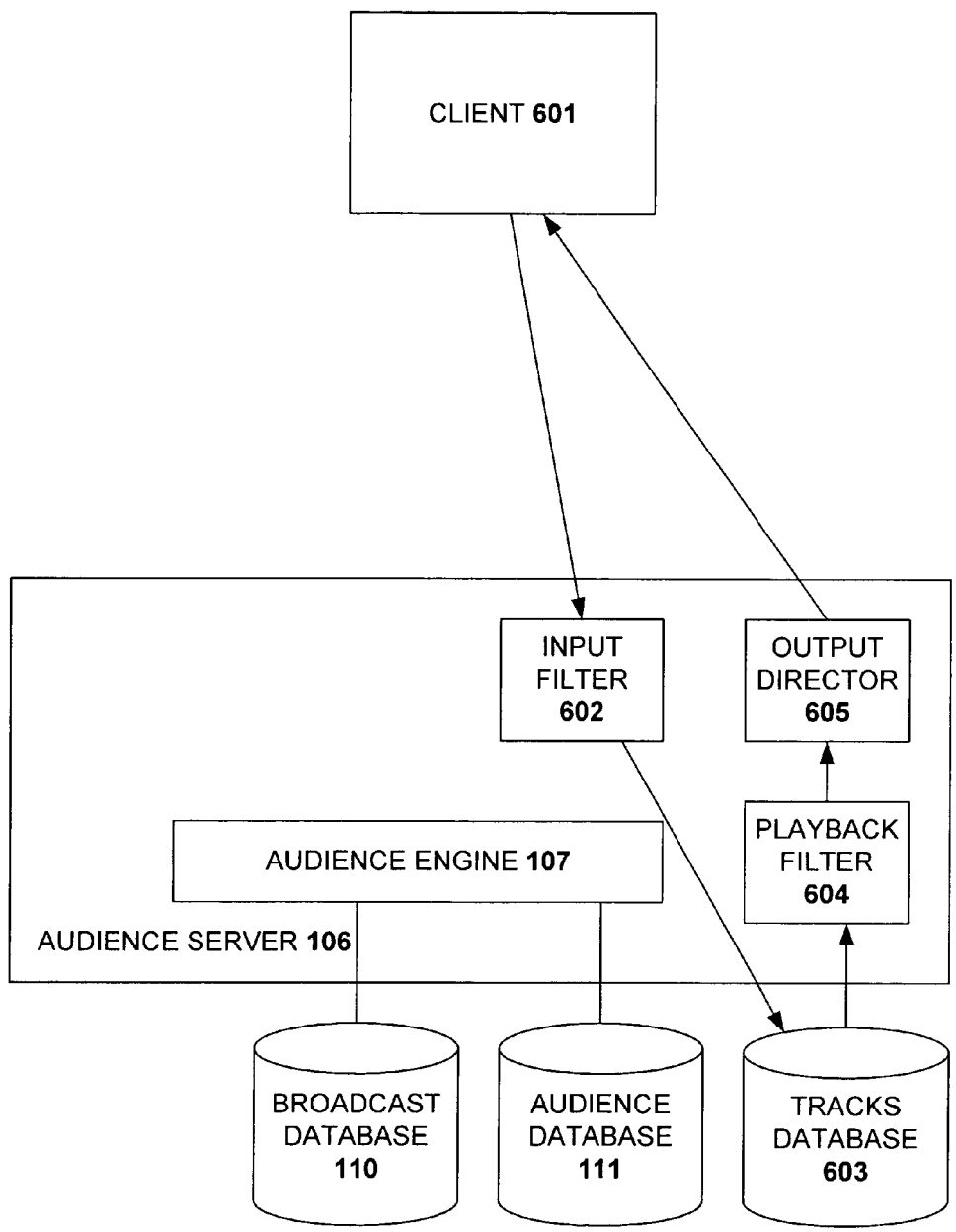
FIG. 6 illustrates an embodiment of a system for providing a distributed non-concurrent audience.

The broadcast can also be provided with a non-concurrent audience. When the broadcast is recorded and can be played back many times, the responses from participants of previous broadcasts can be combined and played for a current participant as a live audience. FIG. 6 illustrates an embodiment of a system for providing a distributed non-concurrent audience. For a non-concurrent audience, previous audience responses are recorded and stored in the tracks database 603. A participant using the client 601 sets parameters and preferences so that the output stream of the previous responses is filtered in a certain way. The audience engine 107 constructs the playback filter 604 based on these preferences. The output stream is sent to the client 601 via the output director 605. At the same time, the participant's response is recorded by the client 601 and sent to the audience engine 107. The audience engine 107 filters the input 602 according to the parameters and records it into the tracks database 603 where it can be later retrieved and combined with other recorded responses.

Figure 7:
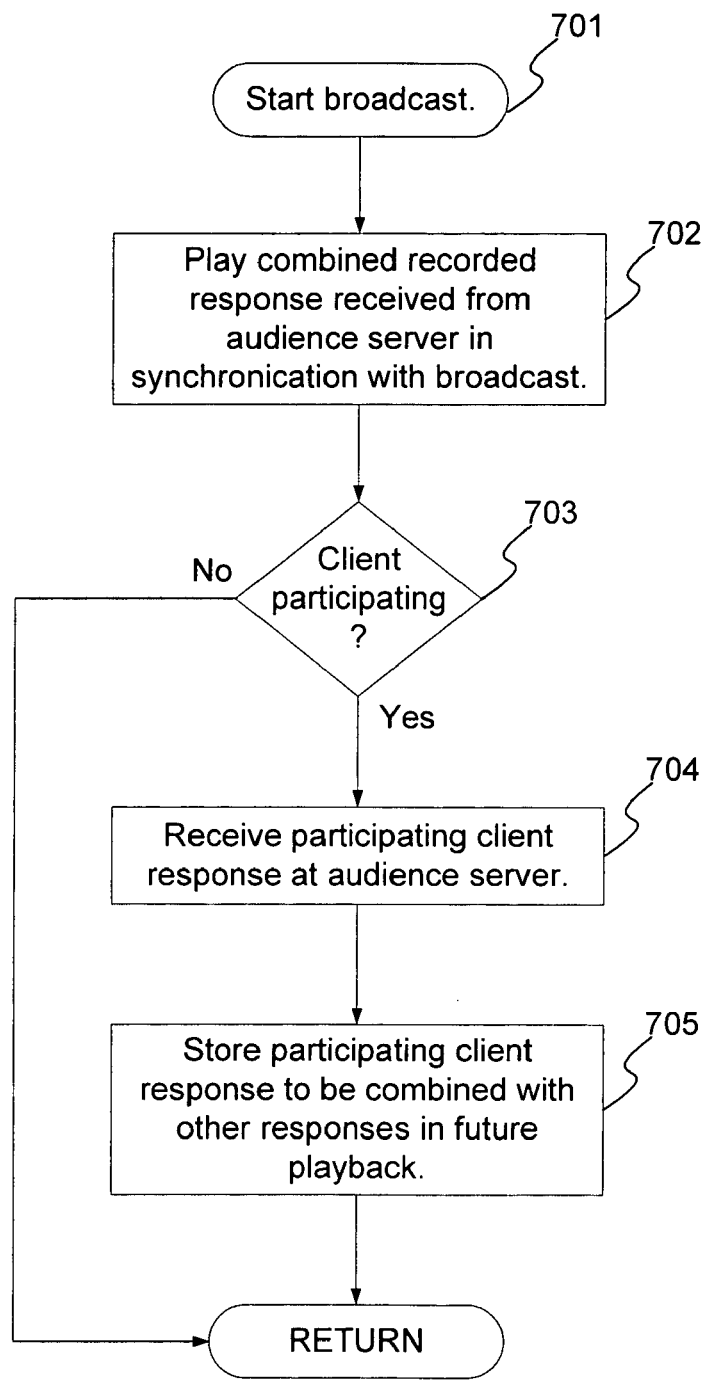
FIG. 7 is a flowchart illustrating an embodiment of a method for providing a distributed non-concurrent audience.

FIG. 7 is a flowchart illustrating an embodiment of a method for providing a distributed non-concurrent audience. Once the broadcast starts, via step 701, the combined recorded response received from the audience server 106 via the output director 605 is played in synchronization with the broadcast, via step 702. To create the combined recorded response, if the user of the client 601 chooses to participate, via step 703, then the client records the participant's response and sends it to the audience engine 107 at the audience server 106. The audience engine 107 at the audience server 106 receives the participant's response, via step 704. The participant's response is then stored in the tracks database 603 to be combined with other responses in future playbacks, via step 705.

Figure 8:
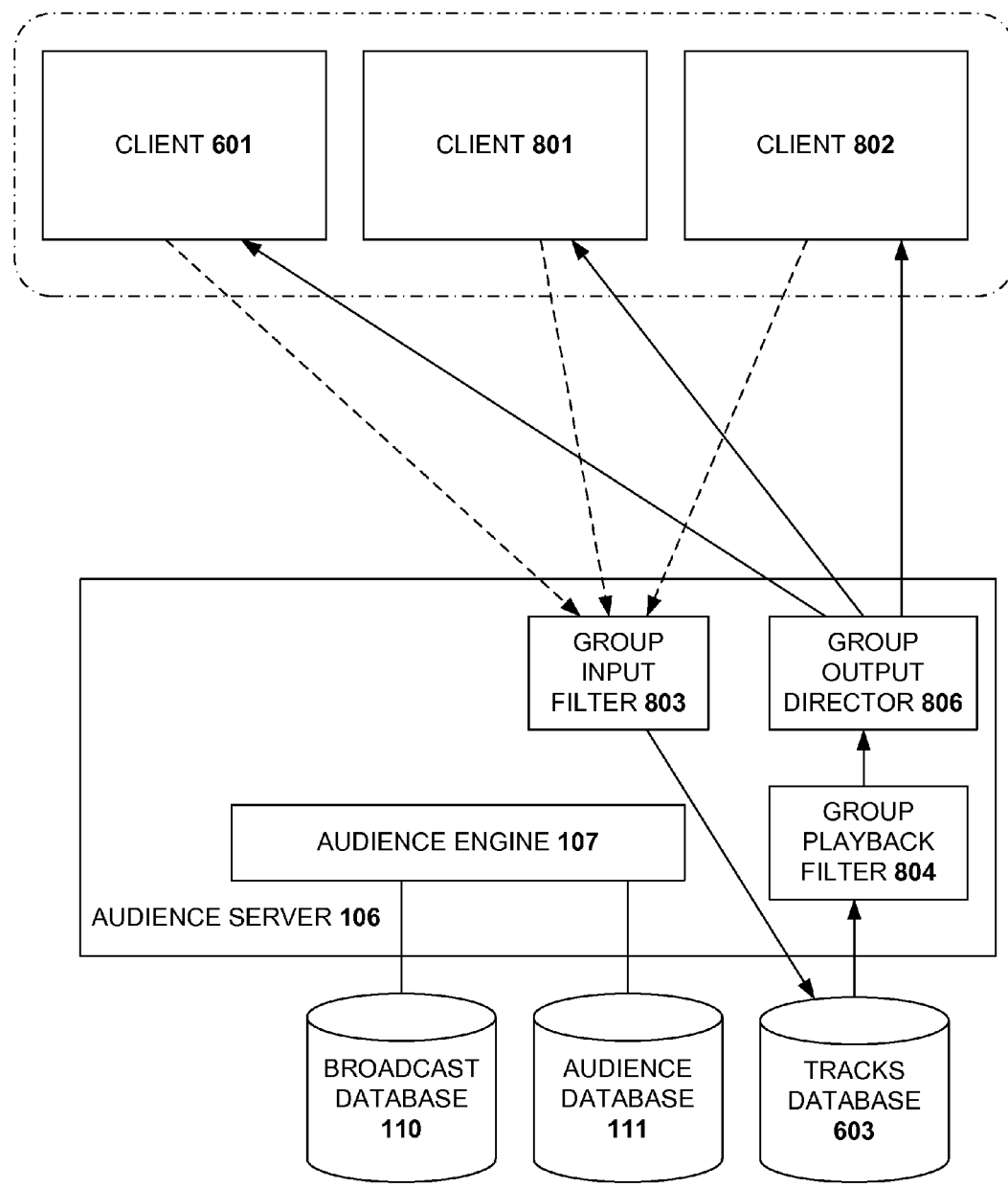
FIGS. 8 and 9 illustrate an embodiment of a system and method, respectively, for providing a non-concurrent group audience.
Figure 9:
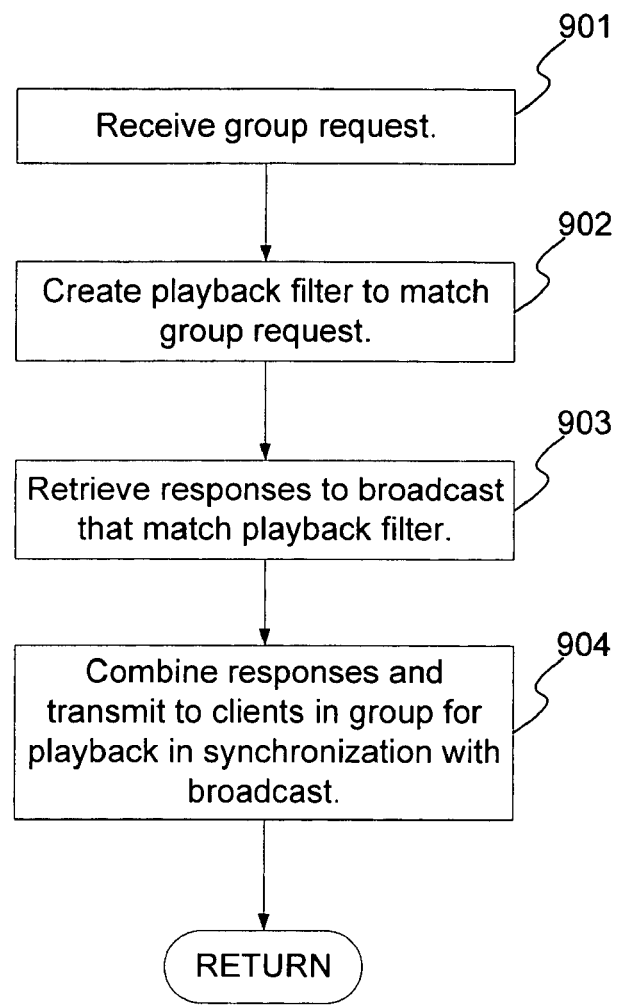

As with the concurrent audience, non-concurrent audiences can also be grouped. FIGS. 8 and 9 illustrate an embodiment of a system and method, respectively, for providing a non-concurrent group audience. Utilizing the audience agent 104, the participants at each client 601, 801, 802 choose to be a group audience. A group input filter 803, a group playback filter 804, and a group output director 806 are defined for the group. When a group request is received, via step 901, the audience engine 107 is sent the parameters and preferences for the group. The audience engine 107 creates the group playback filter 804 to match the group request, via step 902. The previously recorded responses to the broadcast stored in the tracks database 603 that match the playback filter are then retrieved, via step 903. These responses are combined and transmitted to the clients 601, 801, and 802 in the group via the group output director 806 for playback in synchronization with the broadcast, via step 904. At the same time, each participant's response is recorded by their respective client 601, 801, or 802 and sent to the audience engine 107. The audience engine 107 filters the input according to the parameters and records it into the tracks database 603 to be later combined with other recorded responses. Any combination of playback and input filters can be used.

Figure 10:
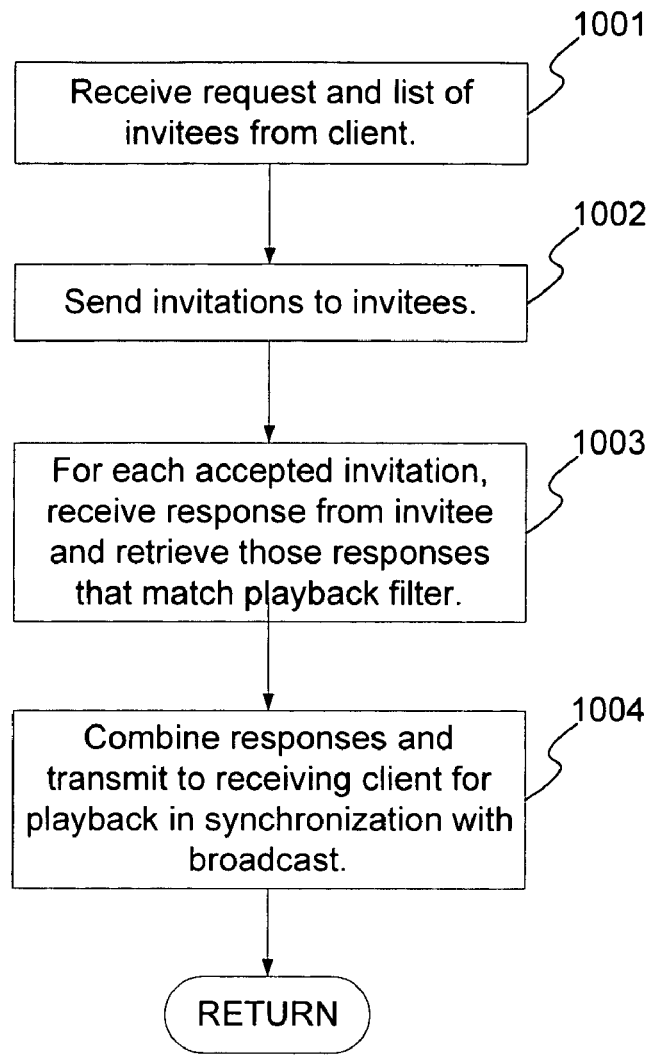
FIG. 10 is a flowchart illustrating an embodiment of a method for providing the "sit next to" feature in a distributed audience response.

A customization that can be provided with any of the systems above is the "sit next to" feature, where one participant chooses to receive the output stream as if he or she is sitting next to another specific participant in the broadcast. FIG. 10 is a flowchart illustrating an embodiment of a method for providing the "sit next to" feature in a distributed audience response. First, a participant creates and sends a list of invitees to the audience server 106. The audience server 106 receives the request to have these invitees be "sitting next to" the participant, via step 1001. The audience server 106 sends invitations to the invitees to join the participant in viewing the broadcast, via step 1002. For each accepted invitation, the audience server 106 receives the response to the broadcast from the invitee, and the responses that match the playback filter are retrieved for creating the audience response, via step 1003. The audience response and the invitee response are combined and transmitted to the client for playback in synchronization with the broadcast, via step 1004. The audience server 106 can create a separate voice channel between the participant and the invitees so that each other's responses are intelligible over the combined audience response.

For example, Dan accesses a web photo album to view a photo slideshow. He selects the "live audience" feature and indicates that he wants to be part of a live audience from his hometown. His personal computer activates its microphone to pick up sound from Dan and also plays the combined sound of audience members from his hometown. Halfway through the slideshow, Dan decides he wants to talk to his sister, Sophia, about the photos during the slideshow. He brings up his "friends list" and sees she too is watching and participating in the live audience. He selects her when activating the "sit next to" feature. Sofia is alerted that Dan wants to sit next to her. She accepts the invitation. Sounds from Dan are then made intelligible over sounds of Sophia's selected audience, while sounds from Sophia are made intelligible over the sound of Dan's selected audience.

For another example, Cecil rents a DVD. He starts the movie and selects the "Actual audience feature". He indicates that he does not want to be part of the audience since he is a very private man. Cecil's entertainment center contacts the audience server, which has recorded actual responses to the movie from thousands of people who opted to participate. Their responses are combined into one audience audio track, which is synchronized with the movie. Cecil chooses to listen to the entire audience response. He could have selected a sub-audience by demographic information, geographic information, date/time of viewing, etc. Cecil can select the "sit next to" feature and invite his friend Chuck. Chuck receives the invitation through his entertainment system and accepts. The DVD stream is shared as the audience track. Sound is picked up at both Chuck's and Cecil's locations and shared between them. Chuck's is added to the "audience" since he chose to participate.

A method and system for providing a distributed audience response for a broadcast has been disclosed. The method and system records a response from a participating client of a broadcast and transmits the response to an audience server. The audience server combines the response with responses from other participating clients of the broadcast, and the combined response is then transmitted to a receiving client for playback in synchronization with the broadcast. Optionally, intelligible speech can be removed form the responses prior to transmission to the receiving client. Optionally, the participating client can be part of a group of clients of the broadcast, where the responses from the group of clients are combined and played back. The participating client can also opt out of the audience and only listen to the audience response without participating. A participant can decide to invite certain other participants to "sit next to" him or her, where the responses of the invitees are configured to be intelligible over the combined response. In this manner, for a distributed broadcast, a more realistic audience or environment is provided, enhancing the experience for the viewer.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a distributed audience response to a broadcast that includes a media stream, comprising:

recording a response to the broadcast from a participating client of a broadcast;

transmitting the recorded response to an audience server; and receiving a combined response media stream by a receiving client from the audience server, wherein the combined response media stream comprises the recorded response and other recorded responses from other participating clients of the broadcast;

wherein the recording comprises:

removing intelligible speech from the response.

* * * * *